United States Patent
Yang et al.

(10) Patent No.: US 10,079,527 B2
(45) Date of Patent: Sep. 18, 2018

(54) SIDE STAND MAGNETIC MOTOR AND COOLING FAN USING SIDE STAND MAGNETIC MOTOR

(71) Applicant: Huawei Technologies Co., Ltd., Shenzhen (CN)

(72) Inventors: Chengpeng Yang, Shenzhen (CN); Xi Chao, Shenzhen (CN); Liang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 14/980,609

(22) Filed: Dec. 28, 2015

(65) Prior Publication Data

US 2016/0111939 A1  Apr. 21, 2016

Related U.S. Application Data

(63) Continuation of application No. PCT/CN2014/081965, filed on Jul. 10, 2014.

(30) Foreign Application Priority Data

Dec. 31, 2014 (CN) .......................... 2013 1 0753140

(51) Int. Cl.
*H02K 1/12* (2006.01)
*H02K 9/22* (2006.01)
(Continued)

(52) U.S. Cl.
CPC .............. *H02K 9/22* (2013.01); *F04D 19/002* (2013.01); *F04D 25/06* (2013.01);
(Continued)

(58) Field of Classification Search
CPC ............. F04D 29/5806; F04D 25/0606; F04D 25/0613; F04D 25/082; F04D 29/522;
(Continued)

(56) References Cited

U.S. PATENT DOCUMENTS 8,376,072 B2    2/2013  Sagara et al.
2002/0024264 A1* 2/2002 Matsumoto ......... F04D 25/0613
                                             310/68 R
(Continued)

FOREIGN PATENT DOCUMENTS

CN    2901677 Y    5/2007
CN    1976177 A    6/2007
(Continued)

OTHER PUBLICATIONS

Partial English Translation and Abstract of German Patent Application No. DE202010017101, Part 1, May 16, 2016, 3 pages.
(Continued)

*Primary Examiner* — Naishadh Desai
(74) *Attorney, Agent, or Firm* — Conley Rose, P.C.

(57) ABSTRACT

A side stand magnetic motor and a cooling fan using the side stand magnetic motor are disclosed and are related to telecommunications device accessory technologies, so as to provide a motor that can effectively and fast dissipate heat generated by a coil of the side stand magnetic motor. The side stand magnetic motor includes a stator, where the stator includes a body and a coil disposed on the body; the magnetic motor further includes an engine base for fastening the stator, a thermally conductive structure of a heat transfer material is disposed on the stator, and the thermally conductive structure is in contact with and is connected to the engine base.

28 Claims, 6 Drawing Sheets

(51) Int. Cl.
| | | |
|---|---|---|
| *F04D 25/06* | (2006.01) | |
| *F04D 25/08* | (2006.01) | |
| *F04D 19/00* | (2006.01) | |
| *F04D 29/32* | (2006.01) | |
| *F04D 29/52* | (2006.01) | |
| *H02K 1/18* | (2006.01) | |
| *F04D 29/58* | (2006.01) | |
| *H02K 9/06* | (2006.01) | |
| *H02K 7/14* | (2006.01) | |

(52) U.S. Cl.
CPC ..... *F04D 25/0606* (2013.01); *F04D 25/0613* (2013.01); *F04D 25/082* (2013.01); *F04D 29/325* (2013.01); *F04D 29/522* (2013.01); *F04D 29/5806* (2013.01); *H02K 1/12* (2013.01); *H02K 1/187* (2013.01); *H02K 9/06* (2013.01); *H02K 7/14* (2013.01)

(58) Field of Classification Search
CPC ...... F04D 19/002; F04D 25/06; F04D 29/325; F04D 19/00; F04D 29/32; F04D 29/52; H02K 1/12; H02K 9/06; H02K 1/187; H02K 9/22; H02K 1/18; H02K 7/14
See application file for complete search history.

(56) References Cited

U.S. PATENT DOCUMENTS

| | | | | |
|---|---|---|---|---|
| 2007/0122293 | A1* | 5/2007 | Sugiyama | F04D 25/082 |
| | | | | 417/354 |
| 2007/0145842 | A1* | 6/2007 | Zhu | F04D 29/582 |
| | | | | 310/88 |
| 2008/0260527 | A1 | 10/2008 | Aoki et al. | |
| 2009/0322180 | A1 | 12/2009 | Nonaka | |
| 2010/0026108 | A1 | 2/2010 | Hassett et al. | |
| 2012/0039732 | A1* | 2/2012 | Chang | F04D 25/082 |
| | | | | 417/423.8 |
| 2012/0085519 | A1* | 4/2012 | Chou | F28D 15/0275 |
| | | | | 165/104.26 |
| 2013/0187484 | A1* | 7/2013 | Liu | H02K 1/187 |
| | | | | 310/43 |

FOREIGN PATENT DOCUMENTS

| | | |
|---|---|---|
| CN | 101669267 A | 3/2010 |
| CN | 102340208 A | 2/2012 |
| CN | 202550806 U | 11/2012 |
| CN | 102957268 A | 3/2013 |
| CN | 103746471 A | 4/2014 |
| DE | 202010017101 U1 | 3/2011 |
| EP | 1257043 A2 | 11/2002 |
| JP | 2003052142 A | 2/2003 |
| JP | 2008178190 A | 7/2008 |

OTHER PUBLICATIONS

Partial English Translation and Abstract of German Patent Application No. DE202010017101, Part 2, May 16, 2016, 2 pages.
Foreign Communication From a Counterpart Application, European Application No. 14875931.9, Extended European Search Report dated May 11, 2016, 6 pages.
Partial English Translation and Abstract of Chinese Patent Application No. CN102340208, Nov. 13, 2015, 4 pages.
Partial English Translation and Abstract of Chinese Patent Application No. CN103746471, Nov. 13, 2015, 4 pages.
Foreign Communication From A Counterpart Application, Chinese Application No. 201310753140.1, Chinese Office Action dated Sep. 6, 2015, 8 pages.
Foreign Communication From A Counterpart Application, PCT Application No. PCT/CN2014/081965, English Translation of International Search Report dated Oct. 15, 2014, 3 pages.
Foreign Communication From A Counterpart Application, PCT Application No. PCT/CN2014/081965, Written Opinion dated Oct. 15, 2014, 6 pages.
Foreign Communication From A Counterpart Application, Chinese Application No. 201310753140.1, Chinese Office Action dated Oct. 17, 2016, 10 pages.

* cited by examiner

SIDE STAND MAGNETIC MOTOR AND COOLING FAN USING SIDE STAND MAGNETIC MOTOR

CROSS-REFERENCE TO RELATED APPLICATIONS

This application is a continuation of International Application No. PCT/CN2014/081965, filed on Jul. 10, 2014, which claims priority to Chinese Patent Application No. 201310753140.1, filed on Dec. 31, 2013, both of which are hereby incorporated by reference in their entireties.

TECHNICAL FIELD

The present disclosure relates to telecommunications device accessory technologies, and in particular, to a side stand magnetic motor and a cooling fan using the side stand magnetic motor.

BACKGROUND

Development of social technologies leads to increasing power consumption of telecommunications devices; in addition, in order to ensure normal running of a device, a heat dissipation requirement of the device needs to be met. Therefore, a cooling fan with a high rotational speed comes into being. Correspondingly, a higher rotational speed of a cooling fan leads to higher motor power density required by the cooling fan.

A currently efficient side stand magnetic motor is used as an example. The side stand magnetic motor is generally disposed sideways, can implement relatively large power output in relatively small space, and has high practicality. As shown in FIG. 1, a cooling fan using a side stand magnetic motor includes a fan frame 10 and a fan base 12 fixedly connected to the frame 10 using a support bracket 11, where a bearing seat 13 of the fan is fixedly connected to the fan base 12, and the side stand magnetic motor used for sleeving and press-mounting a fan blade 14 is fixedly connected to the bearing seat 13 of the fan. The side stand magnetic motor includes a motor base 15 fixedly connected to the bearing seat 13, and a stator (silicon steel sheet) is fastened on the motor base 15, where the stator includes a tubular body 161 and a coil 162 wound around the body 161, an insulation sheet 163 is disposed on an upper end face and a lower end face of the body 161 and between the body 161 and the coil 162, and the coil 162 is bonded to and fastened on the motor base 15 by means of glue pouring, thereby completing fastening of the stator. A rotor is disposed outside the stator, where the rotor includes a tubular enclosure 171, the fan blade 14 is sleeved outside the enclosure 171, a rotor magnet 172 is fastened inside the enclosure 171, and there is a gap between the rotor magnet 172 and the coil 162 of the stator. After the coil 162 is electrified, the stator can drive the rotor to rotate under the action of magnetic induction, thereby enabling the cooling fan to work normally.

In the prior art, heat generated by a coil is dissipated mainly through a gap between a stator and a rotor. Generally, in order to ensure an electromagnetic induction effect, a gap between the stator and the rotor is generally relatively small, causing a relatively small amount of airflow between the stator and the rotor; therefore, efficiency of heat dissipation through the foregoing gap is relatively low.

SUMMARY

Embodiments of the present disclosure provide a side stand magnetic motor and a cooling fan using the side stand magnetic motor, to provide a motor that can effectively and fast dissipate heat generated by a coil of the side stand magnetic motor.

To achieve the foregoing objective, the following technical solutions are adopted in the embodiments of the present disclosure.

According to a first aspect, a side stand magnetic motor is provided, including a stator, where the stator includes a body and a coil disposed on the body, the magnetic motor further includes an engine base for fastening the stator, and a thermally conductive structure of a heat transfer material is disposed on the stator; and the thermally conductive structure is in contact with and is connected to the engine base.

In a first possible implementation manner of the first aspect, the body is of a tubular structure.

With reference to the first possible implementation manner, in a second possible implementation manner, the thermally conductive structure includes a thermally conductive column penetrating through the tubular body, a first end of the thermally conductive column is located inside the body, and a second end thereof protrudes from the body; and the second end of the thermally conductive column is inserted and fastened into the engine base.

With reference to the second possible implementation manner, in a third possible implementation manner, the body is of a cylindrical structure.

With reference to the second and third possible implementation manners, in a fourth possible implementation manner, the thermally conductive column is of a cylindrical structure.

With reference to the second and third possible implementation manners, in a fifth possible implementation manner, the thermally conductive column is connected to the body in an interference fitting manner; or the thermally conductive column is fixedly connected to the body by means of welding.

With reference to the second and third possible implementation manners, in a sixth possible implementation manner, the thermally conductive column is fixedly connected to the engine base by means of welding or gluing.

With reference to the third possible implementation manner, in a seventh possible implementation manner, there are multiple thermally conductive columns penetrating through the body, and the multiple thermally conductive columns are arranged in a circumferential direction of the body.

In an eighth possible implementation manner of the first aspect, the thermally conductive structure includes two first thermally conductive brackets, the two first thermally conductive brackets are respectively located on an upper end face and a lower end face of the body of the stator, and the coil of the stator is wound around the first thermally conductive brackets and the body; and the first thermally conductive bracket located on the lower end face of the body is fixedly connected to the engine base.

With reference to the eighth possible implementation manner, in a ninth possible implementation manner, the body is of a cylindrical structure.

With reference to the ninth possible implementation manner, in a tenth possible implementation manner, the first thermally conductive bracket is of a circular ring structure matching the body.

With reference to the eighth to tenth possible implementation manners, in an eleventh possible implementation manner, the first thermally conductive bracket is matched with and connected to the engine base using a screw; or the first thermally conductive bracket is matched with and connected to the engine base by means of gluing.

With reference to the eighth to tenth possible implementation manners, in a twelfth possible implementation manner, a thermally conductive material is filled between the first thermally conductive bracket and the engine base.

With reference to the eighth to tenth possible implementation manners, in a thirteenth possible implementation manner, a thermally conductive material is filled between the coil and the engine base.

In a fourteenth possible implementation manner of the first aspect, the coil includes multiple metal strips of a sheet structure that are disposed at intervals, the thermally conductive structure is an interconnection board disposed between the stator and the engine base, and the interconnection board is fixedly connected to the engine base; and each of the metal strips includes two plates, where the two plates are respectively attached to an inner side wall and an outer side wall of the body, first ends of the two plates are connected, second ends of the two plates implement an electrical connection using a circuit inside the interconnection board, and the metal strips and the circuit inside the interconnection board jointly form an electrically conductive path of the coil.

With reference to the fourteenth possible implementation manner, in a fifteenth possible implementation manner, the body is of a cylindrical structure, the interconnection board is of a hollow disc-shaped structure, and an outer diameter of the interconnection board is greater than a diameter of the body; and the multiple metal strips are arranged in a circumferential direction of the body.

With reference to the fourteenth and fifteenth possible implementation manners, in a sixteenth possible implementation manner, pads are fixedly disposed on an upper surface of the interconnection board, and the second ends of the two plates are provided with extending ends fixedly connected to the pads; the pads and the extending ends are disposed in a one-to-one corresponding manner, a circuit allowing the two pads corresponding to the two plates to be in communication with each other is disposed inside the interconnection board, and two extending ends of each of the metal strips are respectively fastened on the pads of the extending ends independently of each other; and the two plates are in communication with the circuit inside the interconnection board using the pads.

With reference to the fourteenth and fifteenth possible implementation manners, in a seventeenth possible implementation manner, the interconnection board is fixedly connected to the engine base by means of gluing.

With reference to the fourteenth and fifteenth possible implementation manners, in an eighteenth possible implementation manner, a second thermally conductive bracket is further disposed on the body of the stator, and a top end face of the second thermally conductive bracket is fixedly connected to a bottom end face of the body, and a bottom end face of the second thermally conductive bracket is in contact with the interconnection board.

With reference to the eighteenth possible implementation manner, in a nineteenth possible implementation manner, the body is of a cylindrical structure, the second thermally conductive bracket is of a circular ring structure matching the cylindrical body, and a side surface of the second thermally conductive bracket is in contact with the second ends of the plates.

With reference to the seventeenth possible implementation manner, in a twentieth possible implementation manner, the interconnection board is made of an aluminum nitride (AlN) ceramic material.

According to a second aspect, a cooling fan is provided, including a fan frame, a fan base fixedly connected to the fan frame using a support bracket, and a fan blade, where the cooling fan further includes the foregoing side stand magnetic motor that is configured to drive the fan blade to rotate; and an engine base of the side stand magnetic motor is fixedly connected to the fan base.

In a first possible implementation manner of the second aspect, the engine base and the fan base are of an integrally formed structure.

With reference to the first possible implementation manner, in a second possible implementation manner, a heat sink fin is disposed on the support bracket.

According to the side stand magnetic motor and the cooling fan using the side stand magnetic motor that are provided in the embodiments of the present disclosure, the side stand magnetic motor includes a stator formed by a tubular body and a coil disposed on the body, the stator is fastened on an engine base of the side stand magnetic motor, a thermally conductive structure made of a thermally conductive material is disposed on the stator, and the thermally conductive structure is in contact with and is connected to the engine base. It can be learned through analysis that a thermally conductive structure made of a heat transfer material is disposed on a body and/or a coil, allowing heat generated in an operating process of the coil to be transferred to the thermally conductive structure through the coil and/or the body; then the heat is transferred to an engine base that is in contact with and that is connected to the thermally conductive structure. Because the thermally conductive structure is made of the heat transfer material and has a good heat-conducting property, it can be ensured that the heat generated by the coil is effectively transferred to the engine base through the thermally conductive structure in time, thereby dissipating the heat into air through the engine base in time, which meets a heat dissipation requirement of the side stand magnetic motor, increases power density of the side stand magnetic motor, and features high practicality.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following describes in detail a side stand magnetic motor according to embodiments of the present disclosure with reference to the accompanying drawings.

Figure 1:
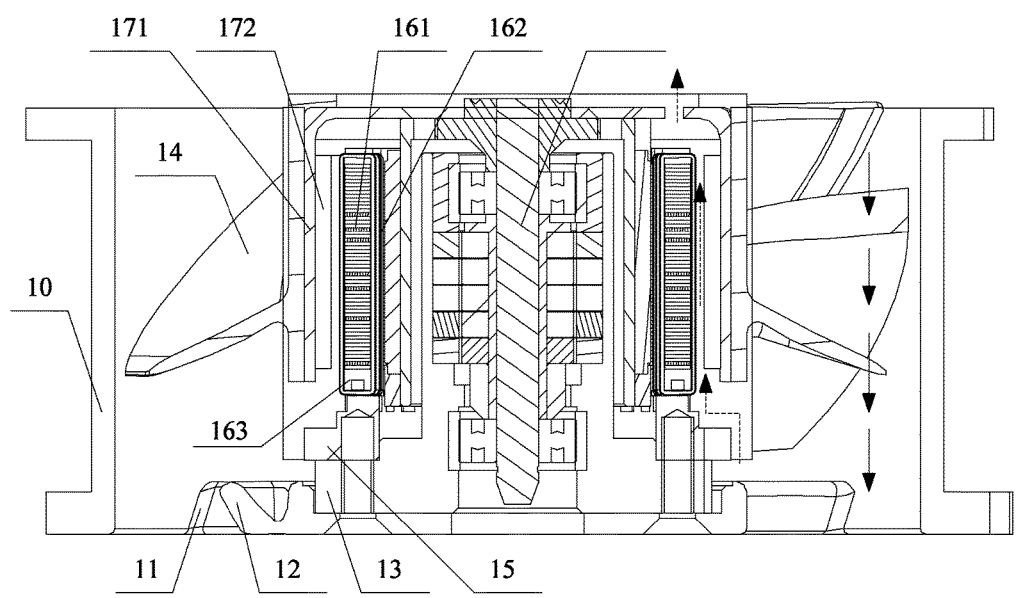
FIG. 1 is a schematic structural diagram of a cooling fan in the prior art.
Figure 2:
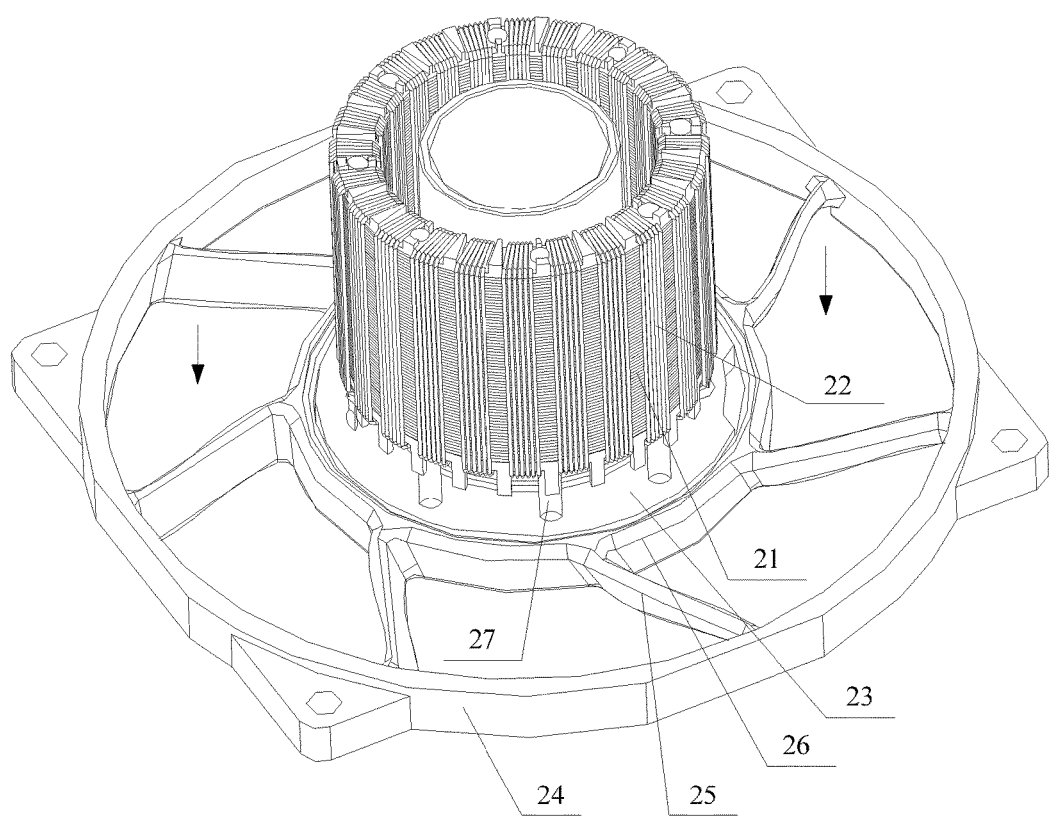
FIG. 2 is a schematic structural diagram of a side stand magnetic motor and a cooling fan using the side stand magnetic motor according to an embodiment of the present disclosure.

An embodiment of the present disclosure provides a side stand magnetic motor, as shown in FIG. 2, including a stator, where the stator includes a body 21 and a coil 22 disposed on the body 21. The side stand magnetic motor further includes an engine base 23 for fastening the stator, a thermally conductive structure of a heat transfer material is disposed on the stator, and the thermally conductive structure is in contact with and is connected to the engine base 23.

The side stand magnetic motor provided in this embodiment of the present disclosure includes a stator consisting of a body and a coil disposed on the body, where the stator is fastened on an engine base of the side stand magnetic motor, a thermally conductive structure made of a heat transfer material is disposed on the stator, and the thermally conductive structure is in contact with and is connected to the engine base. It can be learned through analysis that a thermally conductive structure made of a heat transfer material is disposed on a body and/or a coil, allowing heat generated in an operating process of the coil to be transferred to the thermally conductive structure through the coil and/or the body; then the heat is transferred to an engine base that is in contact with and that is connected to the thermally conductive structure. Because the thermally conductive structure is made of the heat transfer material and has a good heat-conducting property, it can be ensured that the heat generated by the coil is effectively transferred to the engine base through the thermally conductive structure in time, thereby dissipating the heat into air through the engine base in time, which meets a heat dissipation requirement of the side stand magnetic motor, increases power density of the side stand magnetic motor, and features high practicality.

A different location and manner of disposing the thermally conductive structure on the stator leads to a different material, structure, and the like of the thermally conductive structure; however, it is required to ensure that the thermally conductive structure uses a material having a good heat transfer property.

In addition, the side stand magnetic motor is generally used in a cooling fan. Therefore, for ease of description of a heat dissipation process of the side stand magnetic motor in this embodiment and an application scenario thereof, the side stand magnetic motor and the cooling fan using the side stand magnetic motor are used as an example. As shown in FIG. 2, the cooling fan includes a fan frame 24 and a fan base 26 fixedly connected to the fan frame 24 using a support bracket 25, where the fan base 26 is fixedly connected to the engine base 23, and the side stand magnetic motor is configured to connect to a fan blade (not shown in FIG. 2), such that the fan blade can be driven to rotate. In actual application, the body 21 of the stator may be a silicon steel sheet having a good electromagnetic property, and the body 21 is generally of a tubular structure or may be of a cylindrical structure, which helps the coil 22 on the body 21 to drive the fan blade to rotate.

As shown in FIG. 2, the thermally conductive structure includes a cylindrical thermally conductive column 27 penetrating through the cylindrical body 21 of the stator; correspondingly, a through-hole for accommodating the thermally conductive column 27 needs to be disposed on the body 21, and the thermally conductive column 27 may also be of a structure such as a cuboid or a cone. In FIG. 2, in order to ensure integrality of a structure of the stator, a first end of the thermally conductive column 27 is located inside the body 21 and may be disposed coplanar with an upper end face of the body 21; a second end of the thermally conductive column 27 protrudes from the body 21, such that this end can be inserted and fastened into the engine base 23. It can be learned from this that heat generated in an operating process of the coil 22 is first transferred to the body 21, then is transferred to the thermally conductive column 27 of a heat transfer material through the body 21, further is transferred to the engine base 23 through the thermally conductive column 27, and finally can be transferred, through the engine base 23, to the fan base 26 fixedly connected to the engine base 23. In FIG. 2, the heat in the fan base 26 can be further dissipated through the support bracket 25, and in FIG. 2, a direction of an arrow is a flow direction of airflow generated when the cooling fan is operating. It can be learned from this that the airflow can draw away heat in the support bracket 25 and the fan base 26, thereby achieving an objective of fast heat dissipation.

A material, for example, metal and ceramic, having a good heat-conducting property may be selected for all of the engine base 23, the fan base 26, and the support bracket 25. A heat sink fin may be additionally disposed on the support bracket 25 according to a structural requirement, so as to improve a heat dissipation capability of the support bracket 25. The engine base 23 and the fan base 26 may be two parts and be fixedly connected by means of welding, in an interference fitting manner, or the like; or the engine base 23 and the fan base 26 may be disposed integrally to shorten a heat transfer path.

In actual application, in order to improve a heat transfer effect of the thermally conductive column 27, multiple thermally conductive columns 27 may be disposed, and the multiple thermally conductive columns 27 are evenly and equidistantly arranged in a circumferential direction of the body 21. Because the coil 22 is generally evenly and equidistantly arranged on the body 21, the thermally conductive columns 27 may be disposed between neighboring coil groups, so as to ensure proper overall arrangement; in addition, the thermally conductive columns 27 evenly transfer heat of the coil 22, thereby avoiding a local overheating phenomenon.

Further, in order to improve heat exchange between the body 21 and the thermally conductive column 27, generally, an area of contact between the body 21 and the thermally conductive column 27 may be increased, and seamless contact between the body 21 and the thermally conductive column 27 may be ensured. According to a thickness of a side wall of the body 21, a diameter of the thermally conductive column 27 may be set to a value in conformity with the thickness of the side wall (the diameter is less than the thickness of the side wall); in addition, a gap between the body 21 and the thermally conductive column 27 is narrowed in an interference fitting manner, thereby ensuring sufficient contact. The thermally conductive column 27 may also be fastened to the body 21 by means of welding, thereby ensuring that no gap exists between the thermally conductive column 27 and the body 21; in addition, by using metal, heat resistance for heat dissipation is reduced, a heat transfer capability is improved, and further a heat dissipation capability is improved.

In addition, a thermally conductive material may also be filled between the thermally conductive column 27 and an inner wall of the through-hole of the body 21 after the thermally conductive column 27 penetrates through the body 21, so as to improve efficiency of heat transfer between the thermally conductive column 27 and the body 21 while fastening the thermally conductive column 27.

The thermally conductive column 27 may be fastened on the engine base 23 by means of welding, where by means of welding, heat resistance for heat dissipation can be reduced, and heat dissipation can be speeded up. The thermally conductive column 27 may also be fixedly connected by means of gluing or in an interference fitting manner.

Herein, it should be noted that in FIG. 2, the thermally conductive column 27 further needs to penetrate through insulation sheets between an upper end face of the body 21 and the coil 22 and between a lower end face of the body 21 and the coil 22.

A way of heat dissipation in FIG. 2 is to transfer heat to the engine base 23 mainly through multiple thermally conductive columns 27 in time, and then to transfer the heat to the fan base 26, the support bracket 25, and the like, where heat dissipation efficiency of the way of heat dissipation depends on heat transfer efficiency of the thermally conductive columns 27. Therefore, in this case, the engine base 23 may be fixedly connected to the fan base 26. Heat dissipation may also be implemented using a thermally conductive structure shown in FIG. 3, and details are as follows.

Figure 3:
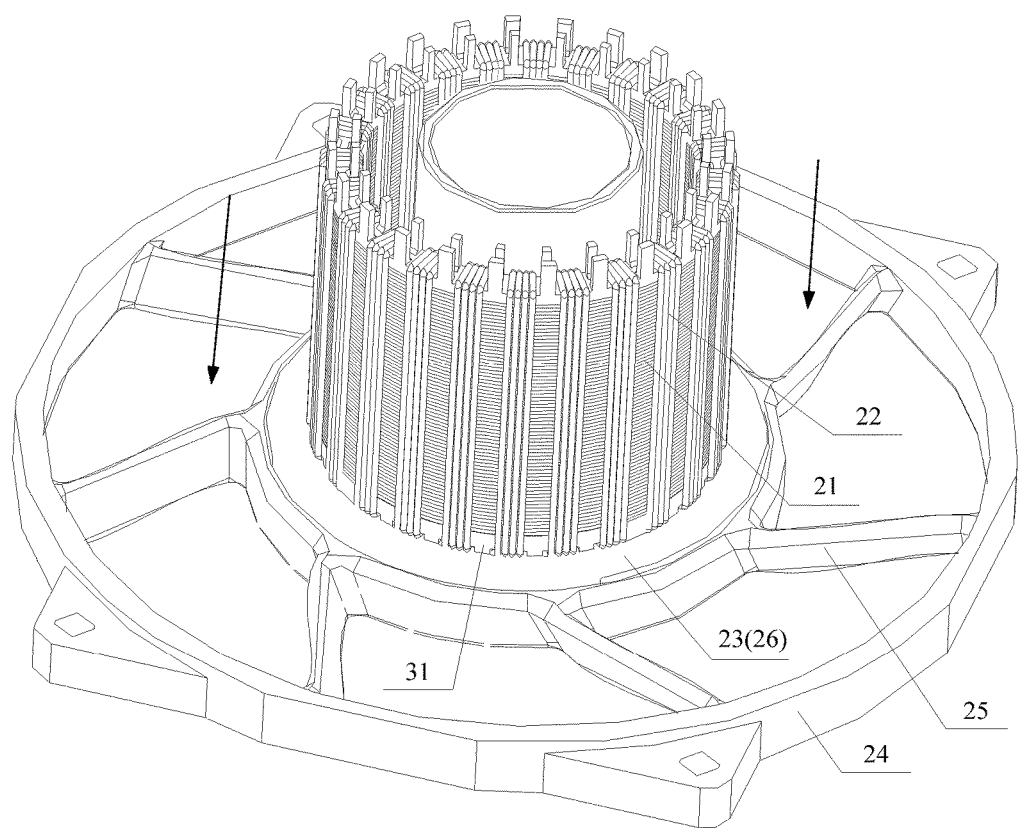
FIG. 3 is a schematic structural diagram of another side stand magnetic motor and a cooling fan using the side stand magnetic motor according to an embodiment of the present disclosure.

In FIG. 3, the thermally conductive structure includes two ring-shaped first thermally conductive brackets 31, where the two first thermally conductive brackets 31 are respectively located on the upper end face and the lower end face of the body 21 of the stator, and the coil 22 is wound around the two first thermally conductive brackets 31 and the body 21 in a manner in the prior art, as shown in FIG. 3. It can be learned from this that heat generated in an operating process of the coil 22 is transferred to the body 21 mainly through the coil 22, and then is transferred, through the body 21, to the first thermally conductive bracket 31 located at a lower end of the body 21, and further is transferred to the engine base 23 fixedly connected to the first thermally conductive bracket 31 at this end. Some heat is directly transferred to the first thermally conductive bracket 31 through the coil 22, and then is transferred to the engine base 23 through the first thermally conductive bracket 31 at the lower end of the body 31. In FIG. 3, the body 21 may be of a cylindrical structure, and the first thermally conductive bracket 31 may be set to a circular ring matching a shape of the body 21.

Finally, the heat can be transferred, through the engine base 23, to the fan base 26 fixedly connected to the engine base 23. In FIG. 3, the heat in the fan base 26 can be further dissipated through the support bracket 25, and in FIG. 3, a direction of an arrow is a flow direction of airflow generated when the cooling fan is operating. It can be learned from this that the airflow can draw away heat in the support bracket 25 and the fan base 26, thereby achieving an objective of fast heat dissipation.

A material, for example, metal and ceramic, having a good heat-conducting property may be selected for all of the engine base 23, the fan base 26, and the support bracket 25. A heat sink fin may be additionally disposed on the support bracket 25, so as to improve a heat dissipation capability of the support bracket 25. The engine base 23 and the fan base 26 may be two parts and be fixedly connected by means of welding, in an interference fitting manner, or the like; or the engine base 23 and the fan base 26 may be disposed integrally to shorten a heat transfer path. In this embodiment, heat is transferred mainly through the first thermally conductive bracket 31 located at the lower end of the body 21; therefore, in order to effectively shorten a heat transfer path, the engine base 23 and the fan base 26 are disposed integrally to speed up heat dissipation.

When the first thermally conductive bracket 31 located at the lower end of the body 21 is fastened on the engine base 23 in a connection manner using a screw or in a matching manner by means of gluing, because the coil 22 is also wound around the first thermally conductive bracket 31, the coil 22 in a lower end area is in contact with the engine base 23. Therefore, still some heat generated by the coil 22 can be directly transferred to the engine base 23, thereby improving heat dissipation efficiency of the coil 22 in multiple ways of heat dissipation.

In order to further improve heat transfer efficiency of the first thermally conductive bracket 31 located at the lower end of the body 21, a thermally conductive material may be filled between the first thermally conductive bracket 31 at the lower end and the engine base 23 without preventing the first thermally conductive bracket 31 at this end from being fastened to the engine base 23. In addition, a thermally conductive material may also be filled between the coil 22 and the engine base 23, so as to facilitate fast heat transfer. The first thermally conductive bracket 31 may use an AlN ceramic material having a quite high heat-conducting property.

Figure 4:
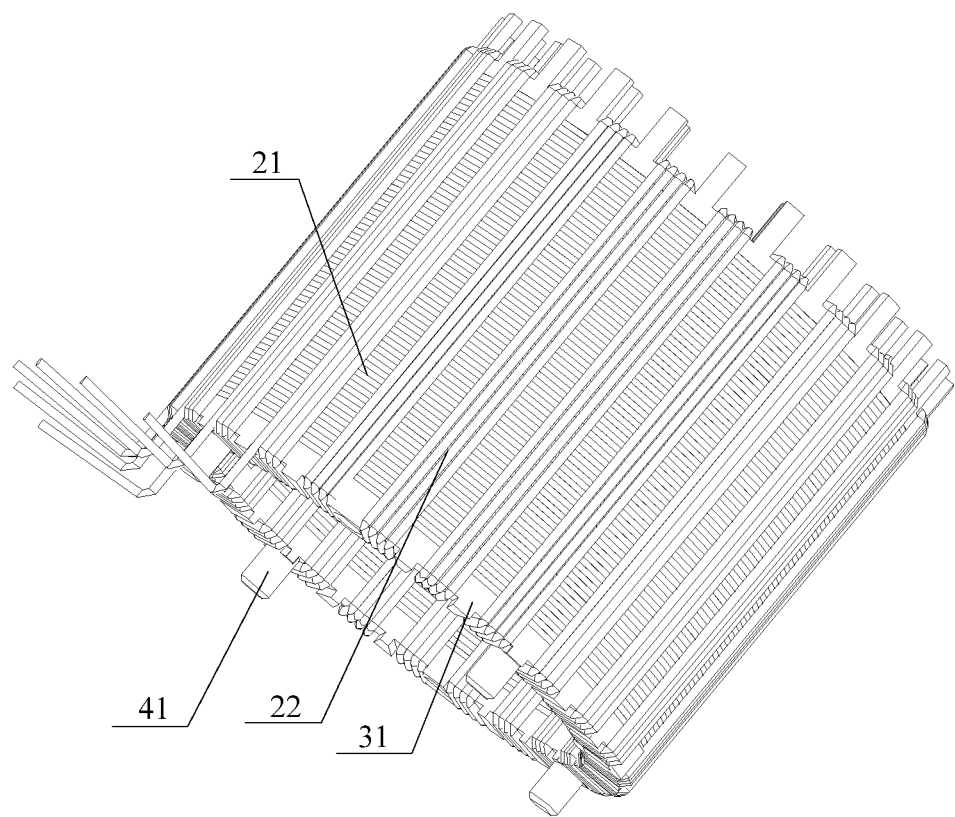
FIG. 4 is a schematic structural diagram of a stator of another side stand magnetic motor according to an embodiment of the present disclosure.

In order to further ensure connective stability between the first thermally conductive bracket 31 and the engine base 23, as shown in FIG. 4, multiple cylindrical objects 41 that are evenly and equidistantly arranged may be disposed on the first thermally conductive bracket 31 at the lower end of the body 31 in a direction parallel to a center line of the body 31, where the cylindrical objects 41 penetrate through the engine base 23 and are fixedly connected to the engine base 23. In addition, these cylindrical objects 41 can further play a role of heat transfer.

Herein, it should be noted that in FIG. 3, the first thermally conductive brackets 31 located at the upper end face and the lower end face of the body 21 may also be directly used as insulation sheets for use; in this case, the first thermally conductive bracket 31 located at an upper end of the body 21 can also transfer heat, where this part of heat can be dissipated through a gap between the stator and a rotor. The first thermally conductive bracket 31 may be disposed at the lower end of the body 21, and an insulation sheet structure may be still used at the upper end.

In FIG. 3, a manner of shortening a heat transfer path is used, that is, the engine base 23 and the fan base 26 are disposed integrally, which may reduce an overall thickness and facilitate fast transfer of heat to a support bracket and the like. This manner is easy to implement and is effective. In this case, the engine base 23 may also be referred to as the fan base 26 or a base.

When a magnetic motor is applied, a main heat source is the coil 22; therefore, heat dissipation efficiency of the coil 22 may be improved by directly changing a structure of the coil 22. Details are shown in FIG. 5.

Figure 5:
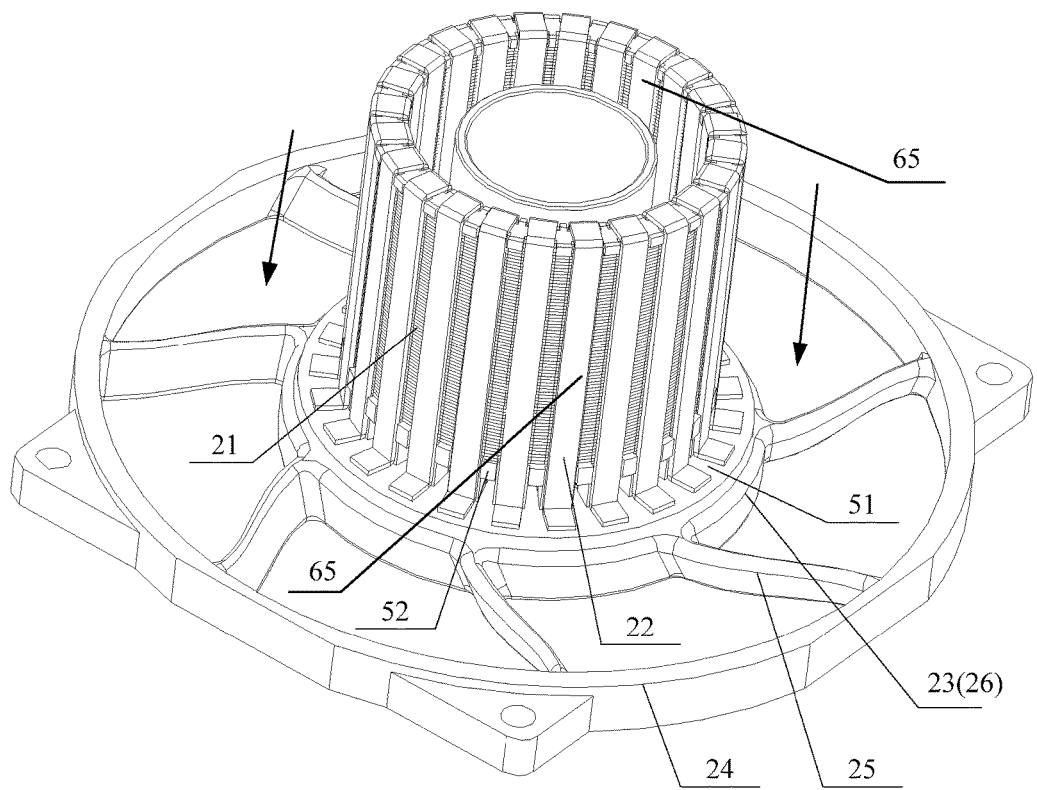
FIG. 5 is a schematic structural diagram of still another side stand magnetic motor and a cooling fan using the side stand magnetic motor according to an embodiment of the present disclosure.

In FIG. 5, the coil 22 includes multiple metal strips that are of a bar-shaped structure and that are disposed at intervals, and the thermally conductive structure is an interconnection board 51 disposed between the stator and the engine base 23, where the interconnection board 51 is fixedly connected to the engine base 23. Compared with a conventional winding coil 22, for the coil 22 including the metal strips, in a case of a same perimeter, the metal strip has a large section area and small resistance; therefore, the metal strip has a strong downward heat conducting capability and produces less heat. Each metal strip includes two plates 65 parallel to each other, where the two plates 65 are respectively attached to an inner side wall and an outer side wall of the body 21, first ends of the two plates 65 are connected, and second ends thereof implement an electrical connection using a circuit inside the interconnection board 51, such that the metal strip and the circuit inside the interconnection board 51 jointly form an electrically conductive path of the coil 22.

Pads may be disposed on an upper surface of the interconnection board 51, and the second ends of the two plates 65 are provided with extending ends fixedly connected to the pads, where the pads and the extending ends are disposed in a one-to-one corresponding manner, that is, each metal strip includes two extending ends, and the two extending ends are each corresponding to one pad, and the two extending ends are not directly connected. The two extending ends of each metal strip are oppositely disposed at intervals, such that each metal strip forms a "⊓"-shaped structure. The plates 65 may be vertically disposed, and the extending ends are perpendicular to the plates 65 and are horizontally disposed. In FIG. 5, the pads may be fastened on the interconnection board 51 in an electroplating manner or a hot pressing manner; the interconnection board is further internally provided with a circuit in communication with the pads, where the circuit may be disposed inside the interconnection board 51 in an electroplating manner or a hot pressing manner, and is connected to the pads by means of welding, so as to facilitate a connection to the metal strips.

When the two plates 65 are respectively attached to the inner side wall and the outer side wall of the body 21, an end part at which the two plates 65 are connected fits a top end face of the body 21; in this case, it is required that a length of the end part (a distance between the two plates 65) be in conformity with the thickness of the body 21. In FIG. 5, the body 21 may be of a cylindrical structure, the interconnection board 51 may be a hollow disc-shaped structure, and an outer diameter of the interconnection board 51 is greater than a diameter of the body 21, such that the interconnection hoard 51 bears the body 21 and is fixedly connected to the extending ends. In FIG. 5, each metal strip is fastened on the body 21 in the foregoing manner; in addition, the multiple metal strips are evenly and equidistantly arranged in a circumferential direction of the body 21. There are multiple manners of arranging the multiple metal strips on the body 21, and the manner in FIG. 5 is an arrangement manner that is relatively proper and relatively neat in appearance.

After attachment of the metal strips is complete, each metal strip is in communication with the circuit using pads of the metal strip, such that all the metal strips and the circuit can jointly form an electrically conductive path of the coil, thereby facilitating a connection to an external power source. The circuit inside the interconnection board 51 needs to be arranged according to a wiring requirement of the electrically conductive path of the coil. The interconnection board 51 may be fastened on the engine base 23 by means of gluing, and a material of the interconnection board 51 may be an AlN ceramic material.

The two plates 65 are respectively attached to an inner side face and an outer side face of a side wall of the body 21, and then the extending ends are fastened on the pads by means of welding, thereby completing fastening of the coil 22. It can be learned from this that heat generated by the coil 22 is directly transferred to the pads mainly through the coil 22, then is transferred to the interconnection board 51 through the pads, and further is transferred to the engine base 23 through the interconnection board 51. When the extending ends of the metal strips are welded to the pads, due to existence of solder, the metal strips may also transfer the heat to the interconnection board through the solder, thereby speeding up dissipation of the heat of the coil 22.

Finally, the heat can be transferred, through the engine base 23, to the fan base 26 fixedly connected to the engine base 23. In FIG. 5, the heat in the fan base 26 can be further dissipated through the support bracket 25, and in FIG. 5, a direction of an arrow is a flow direction of airflow generated when the cooling fan is operating. It can be learned from this that the airflow can draw away heat in the support bracket 25 and the fan base 26, thereby achieving an objective of fast heat dissipation.

A material, for example, metal and ceramic, having a good heat-conducting property may be selected for all of the engine base 23, the fan base 26, and the support bracket 25. A heat sink fin may be additionally disposed on the support bracket 25, so as to improve a heat dissipation capability of the support bracket 25. The engine base 23 and the fan base 26 may be two parts and be fixedly connected by means of welding, in an interference fitting manner, or the like; or the engine base 23 and the fan base 26 may be disposed integrally to shorten a heat transfer path. In this embodiment, the heat is transferred mainly through the interconnection board 51; therefore, in order to effectively shorten a heat transfer path, the engine base 23 and the fan base 26 are disposed integrally to speed up heat dissipation.

In FIG. 5, in order to develop a way of heat dissipation of the coil 22, that is, to dissipate some heat through the body 21, second thermally conductive brackets 52 may also be disposed on the upper end face and the lower end face of the body 21, where the second thermally conductive bracket 52 may be of a circular ring structure matching the body 21. An upper end face of the second thermally conductive bracket 52 located at the lower end of the body 21 is fixedly connected to a bottom end face of the body 21, and a lower end face thereof is in contact with and/or is connected to the interconnection board 51, such that some heat of the coil 22 can be transferred, through the body 21, to the second thermally conductive bracket 52 located at the lower end of the body 21, then is transferred to the interconnection board 51 through the second thermally conductive bracket 52, and further is transferred to the engine base 23 and the like; therefore, the heat is fast dissipated. In addition, because the metal strip is fastened in an attachment manner, a bottom part (the second ends of the plates 65) of the metal strip is further in contact with a side surface of the second thermally conductive bracket 52 located at a bottom end of the body 21, developing a heat transfer path.

Herein, it should be noted that the second thermally conductive brackets 52 may replace the insulation sheets at the upper end face and the lower end face of the body 21. In FIG. 5, a manner of shortening a heat transfer path is used, that is, the engine base 23 and the fan base 26 are disposed integrally, which may reduce an overall thickness and facilitate fast transfer of heat to a support bracket and the like. This manner is easy to implement and is effective. In this case, the engine base 23 may also be referred to as the fan base 26 or a base.

Generally, compared with a side stand magnetic motor in the prior art, heat dissipation efficiency of the side stand magnetic motor can be effectively improved using the thermally conductive structure shown in FIG. 2 to FIG. 5, where motor power density can be increased by 60 percent (%) using the thermally conductive structure shown in FIG. 2, and motor power density can be increased by 100% using the thermally conductive structure shown in FIG. 3 to FIG. 5. Therefore, the side stand magnetic motor has high practicality.

An embodiment of the present disclosure further provides a cooling fan, including a fan frame, a fan base fixedly connected to the fan frame using a support bracket, and a fan blade, and further including the side stand magnetic motor that is described in the foregoing embodiment and that is configured to drive the fan blade to rotate, where an engine base of the side stand magnetic motor is fixedly connected to the fan base.

According to the cooling fan further provided in this embodiment of the present disclosure, the side stand magnetic motor described in the foregoing embodiment is used, where the side stand magnetic motor includes a stator formed by a tubular body and a coil disposed on the body, the stator is fastened on an engine base of the side stand magnetic motor, a thermally conductive structure made of a thermally conductive material is disposed on the stator, and the thermally conductive structure is in contact with and is connected to the engine base. It can be learned through analysis that a thermally conductive structure made of a heat transfer material is disposed on a body and/or a coil, allowing heat generated in an operating process of the coil to be transferred to the thermally conductive structure through the coil and/or the body; then the heat is transferred to an engine base that is in contact with and that is connected to the thermally conductive structure. Because the thermally conductive structure is made of the heat transfer material and has a good heat-conducting property, it can be ensured that the heat generated by the coil is effectively transferred to the engine base through the thermally conductive structure in time, thereby dissipating the heat into air through the engine base in time, which meets a heat dissipation requirement of the side stand magnetic motor, increases power density of the side stand magnetic motor, and features high practicality.

The engine base may be fixedly connected to the fan base by means of welding or in an interference fitting manner, or the engine base and the fan base are of an integrally formed structure, where if the latter structure is selected, a heat transfer path can be shortened. A different connection structure for the engine base and the fan base may be selected according to a different thermally conductive structure of the side stand magnetic motor. This selection manner is widely used and has been described in the foregoing embodiment; therefore, details are not described herein again.

Further, a heat sink fin structure may be disposed on the support bracket, so as to speed up heat dissipation at a location of the support bracket, and improve overall heat dissipation efficiency. The heat sink fin structure may be disposed according to a need.

Figure 6:
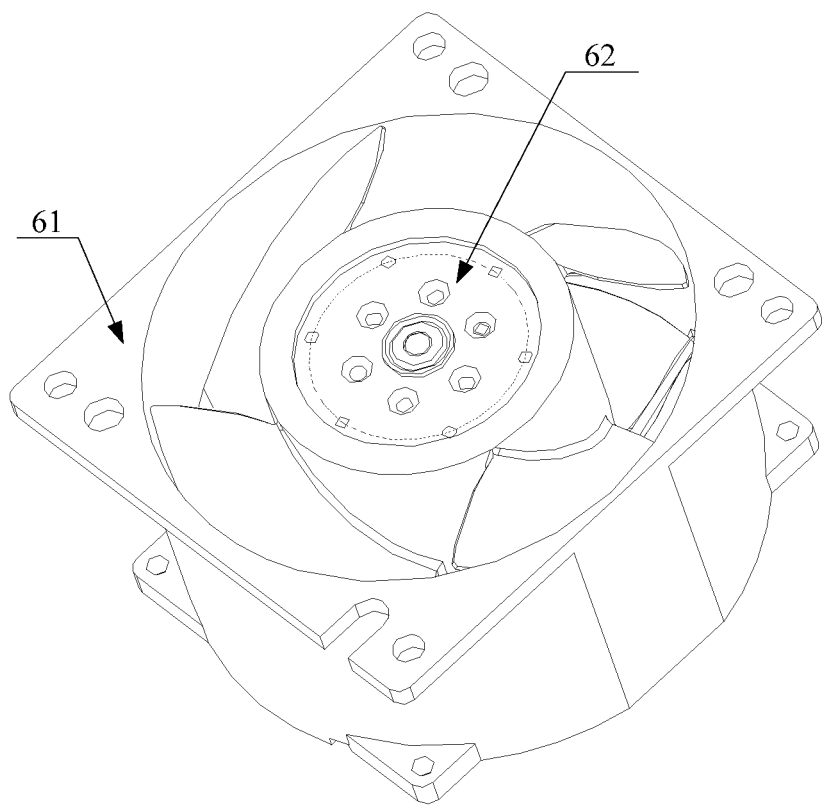
FIG. 6 is a schematic structural diagram of a cooling fan using a side stand magnetic motor according to an embodiment of the present disclosure.

FIG. 6 shows a cooling fan 61 using a side stand magnetic motor 62.

In the descriptions of the present disclosure, it should be understood that orientations or position relationships indicated by terms "center", "upper", "lower", "front", "back", "left", "right", "vertical", "horizontal", "top", "bottom", "inner", "outer", and the like are orientations or position relationships shown in the accompanying drawings, which are not intended to indicate or imply that the described apparatus or component shall have a particular orientation or be constructed or operated in a particular orientation, but are merely for ease of description of the present disclosure and for brevity of description, which, therefore, shall not be construed as a limitation on the present disclosure.

Terms "first" and "second" are merely used for description, but shall not be construed as an indication or implication of relative importance or as an implication of a quantity of technical features. Therefore, features limited by "first" and "second" may indicate or imply that one or more features are included. In the descriptions of the present disclosure, unless otherwise specified, "multiple" means two or more than two.

In the descriptions of the present disclosure, it should be noted that terms "install", "link", and "connect" should be understood broadly unless otherwise expressly provided and limited; for example, being fixedly connected, detachably connected, or integrally connected, being mechanically connected or electrically connected, being directly linked, being indirectly linked using a medium, or being communicated within two components may be possible. A person of ordinary skill in the art may understand specific meanings of the foregoing terms in the present disclosure in the light of the specific circumstances.

In the descriptions of this specification, specific features, structures, materials, or characteristics may be combined in any one or more embodiments or examples in a proper manner.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A side stand magnetic motor, comprising:
   a stator comprising:
      a body;
      a thermally conductive structure disposed at least partially within the body and comprising a thermally conductive bracket; and
      a coil disposed around the thermally conductive bracket and the body; and
      an engine base coupled to the thermally conductive bracket.

2. The side stand magnetic motor of claim 1, wherein the body is of an annular structure.

3. The side stand magnetic motor of claim 2, wherein the thermally conductive structure comprises a thermally conductive column penetrating through the body, a first end of the thermally conductive column is located inside the body, a second end thereof protrudes from the body, and the second end of the thermally conductive column is inserted into the engine base.

4. The side stand magnetic motor of claim 3, wherein the thermally conductive column is cylindrical in shape.

5. The side stand magnetic motor a claim 3, wherein the thermally conductive column is connected to the body in an interference fitting manner or is welded to the body.

6. The side stand magnetic motor of claim 3, wherein the thermally conductive column is welded or glued to the engine base.

7. The side stand magnetic motor of claim 3, wherein there are multiple thermally conductive columns penetrating through the body, and the multiple thermally conductive columns are arranged in a circumferential direction of the body.

8. The side stand magnetic motor of claim 1, wherein the thermally conductive bracket is located on a lower end face of the body, the thermally conductive structure further comprises a second thermally conductive bracket, the second thermally conductive bracket is located on an upper end face of the body, and the coil is further wound around the second thermally conductive bracket.

9. The side stand magnetic motor of claim 8, wherein the body is annular in shape.

10. The side stand magnetic motor of claim 9, wherein the thermally conductive bracket comprises a circular ring structure having a same central axis as the body.

11. The side stand magnetic motor of claim 8, wherein the thermally conductive bracket is screwed or glued to the engine base.

12. The side stand magnetic motor of claim 8, further comprising a thermally conductive material located between the thermally conductive bracket and the engine base.

13. The side stand magnetic motor of claim 8, further comprising a thermally conductive material is located between the coil and the engine base.

14. A side stand magnetic motor, comprising:
a stator comprising:
a body comprising an inner side wall and an outer side wall;
a thermally conductive structure disposed within the body; and
a coil disposed on the body and comprising multiple metal strips of a sheet structure, each of the metal strips comprising two plates each comprising a first end and a second end, the two plates being attached to the inner side wall and the outer side wall, respectively, the first ends being connected to each other, the second ends implementing an electrical connection using a circuit inside an interconnection board, and the metal strips and the circuit jointly forming an electrically conductive path; and
an engine base coupled to the thermally conductive structure.

15. The side stand magnetic motor of claim 14, wherein the body is annular in shape, the interconnection board is of a hollow disc-shaped structure, an outer diameter of the interconnection board is greater than an inner diameter of the body, and the multiple metal strips are arranged in a circumferential direction of the body.

16. The side stand magnetic motor of claim 14, wherein pads are fixedly disposed on an upper surface of the interconnection board, the second ends of the two plates are provided with extending ends fixedly connected to the pads, there is a one-to-one correspondence between the pads and the extending ends, the circuit allows the pads corresponding to the two plates to be in communication with each other, two extending ends of each of the metal strips are fastened on the pads of the extending ends independently of each other, and the two plates are in communication with the circuit inside the interconnection board via the pads.

17. The side stand magnetic motor of claim 14, wherein the interconnection board is glued to the engine base.

18. The side stand magnetic motor of claim 14, wherein a thermally conductive bracket is further disposed on the body of the stator, a top end face of the thermally conductive bracket is fixedly connected to a bottom end face of the body, and a bottom end face of the thermally conductive bracket is in contact with the interconnection hoard.

19. The side stand magnetic motor of claim 18, wherein the body is annular in shape, the thermally conductive bracket comprises a circular ring that has the same central axis as the body, and a side surface of the thermally conductive bracket is in contact with the second ends of the plates.

20. The side stand magnetic motor of claim 17, wherein the interconnection board is made of an aluminum nitride (AlN) ceramic material.

21. A cooling fan, comprising:
a fan frame;
a fan base fixedly connected to the fan frame;
a fan blade;
a side stand magnetic motor configured to drive the fan blade to rotate and comprising:
a stator comprising:
a body;
a thermally conductive structure disposed at least partially within the body and comprising a thermally conductive bracket;
a coil disposed on the body; and
an engine base of the side stand magnetic motor fixedly connected to the fan base and the thermally conductive structure.

22. The cooling fan of claim 21, wherein the engine base and the fan base are of an integrally formed structure.

23. The cooling fan of claim 22, wherein a heat sink fin is disposed on the support bracket.

24. The cooling fan of claim 21, wherein the body is of annular in shape.

25. The cooling fan of claim 24, wherein the thermally conductive structure comprises a thermally conductive column penetrating through the body, a first end of the thermally conductive column is located inside the body, a second end of the thermally conductive column protrudes from the body, and the second end of the thermally conductive column is inserted and fastened into the engine base.

26. The cooling fan of claim 21, wherein the thermally conductive structure comprises two thermally conductive brackets, the two thermally conductive brackets are located on an upper end face and a lower end face of the body, respectively, the coil is wound around the thermally conductive brackets and the body, and the thermally conductive bracket located on the lower end face of the body is fixedly connected to the engine base.

27. The cooling fan of claim 21, wherein the coil comprises multiple metal strips of a sheet structure that are disposed at intervals, the thermally conductive structure is an interconnection board disposed between the stator and the engine base, the interconnection board is fixedly connected to the engine base, each of the metal strips comprises two plates each comprising a first end and a second end, the two plates are attached to an inner side wall and an outer side wall of the body, respectively, the first ends of the two plates are connected to each other, the second ends of the two plates implement an electrical connection using a circuit inside the interconnection board, and the metal strips and the circuit inside the interconnection board jointly form an electrically conductive path for the coil.

28. The cooling fan of claim 27, wherein the body is annular in shape, the interconnection board is of a hollow disc-shaped structure, an outer diameter of the interconnection board is greater than an inner diameter of the body, and the multiple metal strips are arranged in a circumferential direction of the body.

* * * * *

UNITED STATES PATENT AND TRADEMARK OFFICE
CERTIFICATE OF CORRECTION

PATENT NO. : 10,079,527 B2
APPLICATION NO. : 14/980609
DATED : September 18, 2018
INVENTOR(S) : Chengpang Yang, Xi Chao and Liang Li Page 1 of 1

It is certified that error appears in the above-identified patent and that said Letters Patent is hereby corrected as shown below:

On the Title Page

Item (30), Line 1: "Dec. 31, 2014" should read "Dec. 31, 2013"

Item (30), Line 1: "201310753140" should read "201310753140.1"

Signed and Sealed this
Twenty-third Day of October, 2018

Andrei Iancu
*Director of the United States Patent and Trademark Office*